(12) United States Patent
Cermak (10) Patent No.: US 7,370,400 B2
(45) Date of Patent: May 13, 2008

(54) METHOD OF AND DEVICE FOR ASSEMBLING A CONSTANT VELOCITY JOINT

(75) Inventor: Herbert Cermak, Bessenbach (DE)

(73) Assignee: GKN Driveland Deutschland GmbH (DE)

( * ) Notice: Subject to any disclaimer, the term of this patent is extended or adjusted under 35 U.S.C. 154(b) by 510 days.

(21) Appl. No.: 10/829,828

(22) Filed: Apr. 22, 2004

(65) Prior Publication Data

US 2004/0231130 A1   Nov. 25, 2004

(30) Foreign Application Priority Data

Apr. 22, 2003   (DE) ............................... 103 18 112

(51) Int. Cl.
   *B23P 11/02*   (2006.01)
(52) U.S. Cl. ........................................ 29/450; 29/441.1

(58) Field of Classification Search .................. 29/450, 29/725, 441.1, 898.044, 898.045, 898.061, 29/898.062, 898.064, 898.09; 464/904, 906; 72/383

See application file for complete search history.

(56) References Cited

U.S. PATENT DOCUMENTS

| 3,068,551 | A | * | 12/1962 | Cobb | .................... 29/898.044 |
| 6,796,906 | B2 | * | 9/2004 | Cermak | ..................... 464/145 |
| 2002/0193166 | A1 | | 12/2002 | Cermak | |

FOREIGN PATENT DOCUMENTS

WO   WO 02/02960   *   1/2002

* cited by examiner

*Primary Examiner*—David P. Bryant
*Assistant Examiner*—Christopher M Koehler (57) ABSTRACT

A method of and device for assembling joint components of constant velocity joints wherein into an annular first joint component with a greater diameter and a first longitudinal axis, there is introduced an annular or star-shaped second joint component with a smaller diameter and a longitudinal axis. The first joint component whose introducing aperture is smaller than the smallest radial projection face of the second joint component is ovalized for the purpose of introducing the second joint component due to the effect of at least four groups of forces, with the first and second longitudinal axes being positioned perpendicularly relative to one another.

7 Claims, 6 Drawing Sheets

METHOD OF AND DEVICE FOR ASSEMBLING A CONSTANT VELOCITY JOINT

TECHNICAL FIELD

The invention relates to a method and device for deforming an annular first component of a constant velocity joint for introducing into same an annular or star-shaped second joint component of a constant velocity joint.

BACKGROUND OF THE INVENTION

From U.S. Publication No. 2002/0193166 A1, there is known a constant velocity joint with a ball cage which can be elastically ovalized to such an extent that, when the axes of the ball cage and inner joint part intersect one another approximately perpendicularly and upon contact between a web of the inner joint part and the inner face of the ball cage, the opposed web of the inner joint part is able to pass through an end aperture or the inner joint part is able, via the smallest side projection, to pass through an end aperture of the ball cage or the inner joint part, via the greatest diameter, is able to pass through an end aperture of the ball cage.

With the latter embodiments more particularly, the ball cage has to be subjected to a high degree of deformation which leads to the cage being subjected to a high load, so that, when the load is relieved, a permanent deformation may result.

SUMMARY OF THE INVENTION

The present invention provides a method of and a device for deforming an annular first joint component of a constant velocity joint for introducing into same a second joint component of a constant velocity joint, wherein the stresses occurring during deformation are minimized and, simultaneously, greater diameters for introducing the parts are achievable.

A method of assembling joint components of constant velocity universal joints is disclosed, wherein into an annular first joint component with a greater diameter and with a first longitudinal axis, there is introduced an annular or star-shaped second joint component with a smaller diameter and with a second longitudinal axis. In the starting condition, an introducing aperture in the first joint component is smaller than the smallest radial projection area of the second joint component and wherein the first joint component—for introducing purposes, with the first and second longitudinal axes being positioned perpendicularly relative to one another—is ovalized due to the effect of at least four groups of forces. The starting condition refers to the condition in which ovalization starts.

This method is advantageous in that the first joint component is elastically ovalized in such a way that the resulting shortest inner diameter assumes a minimum, and the longest inner diameter a maximum and that, at the same time, the stresses occurring in the first joint component are minimal. The surface of the introducing aperture of the first joint component in the starting condition can be circular and kept as small as possible, thus achieving a uniform, high strength of the joint component.

According to a further embodiment of the invention, the first joint component is provided in the form of a ball cage and the second joint component in the form of an inner joint part. The ball cage is ovalized for the purpose of introducing the inner joint part. According to an alternative embodiment, the first joint component is provided in the form of an outer joint part and the second joint component in the form of a ball cage, with the outer joint part being ovalized for the purpose of introducing the ball cage. Thin-walled outer joint parts which comprise a substantially uniform wall thickness and are easily elastically deformable are particularly suitable.

According to another embodiment, first the inner joint part is introduced into the ball cage and subsequently, the unit formed in this way is introduced into the ovalized outer joint part, with the longitudinal axes of the ball cage and outer joint part being positioned perpendicularly relative to one another.

In order to ensure that the first joint component is ovalized symmetrically, the at least four groups of forces should be identical in magnitude. According to one embodiment, two diametrically opposed groups of forces form a pair of groups of forces comprising, in the starting condition, a common force effecting plane containing the first longitudinal axis. The force effecting planes of the at least two pairs of groups of forces enclose an acute angle which should be greater than 50° and smaller than 70°. In this embodiment, the ratio of the shortest inner diameter to the longest inner diameter of the first joint component—with simultaneously minimum component stresses—is particularly advantageous for introducing the second joint component.

Furthermore, the invention provides a device for deforming an annular first joint component of a constant velocity joint for introducing into same a second joint component of the constant velocity joint. The device comprises at least four jaws positioned opposite one another in pairs for generating groups of forces acting from the outside. The jaws can be arranged in such a way that the force effecting planes formed by two diametrically opposed groups of forces intersect one another in the starting condition for assembly. The starting condition refers to the condition in which ovalization starts.

According to one embodiment, each two jaws with their pressure faces are positioned diametrically opposite one another. In this way it is possible to achieve a symmetric oval deformation of the first joint component.

Each two adjoining jaws can be held on a common carrier, wherein at least one of the two carriers is displaceable on an axis of feed (E) extending transversely to the first longitudinal axis. Such a device is advantageous in that its design is simple. The two jaws can be produced so as to be integral with the associated carrier. Alternatively, the two jaws can be arranged on a common carrier and be displaceable and fixable transversely to the axis of feed. The device can thus be adapted to differently dimensioned first joint components which are desired to be ovalized.

According to a further embodiment, two carriers with two jaws each are provided, with the jaws being arranged in such a way that the two force effecting planes of the radial force components which can be generated via the pressure faces, in the starting condition, intersect one another at an acute angle ranging between 50° and 70°.

According to an advantageous embodiment, the pressure faces of the jaws, if viewed in a longitudinal section, are adapted to the outer contour of the first joint component. More particularly, said pressure faces can be concave. In this way it is possible, by means of one pressure face, to generate a group of forces consisting of two forces which act on axially spaced points of the joint component. More particularly, this is advantageous when ovalizing ball cages as in this way it is possible to apply forces to the annular elements which axially adjoin the cage windows, thus achieving a uniform elastic deformation. In certain individual cases, the group of forces can consist of one single force, for example for ovalizing an outer joint part.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 2 shows the ball cage on its own:
A) in a cross-sectional view; and
B) in a longitudinal section.

FIG. 3 shows the inner joint part on its own:
A) in an axial view; and
B) in a longitudinal section.

FIG. 4 shows an inventive device with a ball cage:
A) in a cross-sectional view; and
B) in a longitudinal section.

FIG. 6 shows the assembly stages of the ball cage and inner joint part:
A) the ovalized ball cage in an axial view;
B) the inner joint part in an axial view and the ball cage in a longitudinal section in a first stage;
C) the inner joint part in an axial view and the ball cage in a longitudinal section in a second stage;
D) the inner joint part in an axial view and the ball cage in a longitudinal section in a third stage;
E) the inner joint part in an axial view and the ball cage in a longitudinal section in a fourth stage; and
F) the inner joint part in an axial view and the ball cage in a longitudinal section in a fifth stage.

FIG. 7 shows an inventive device with an outer joint part:
A) in a cross-sectional view; and
B) in a longitudinal section.

DETAILED DESCRIPTION OF THE DRAWINGS

Figure 1:
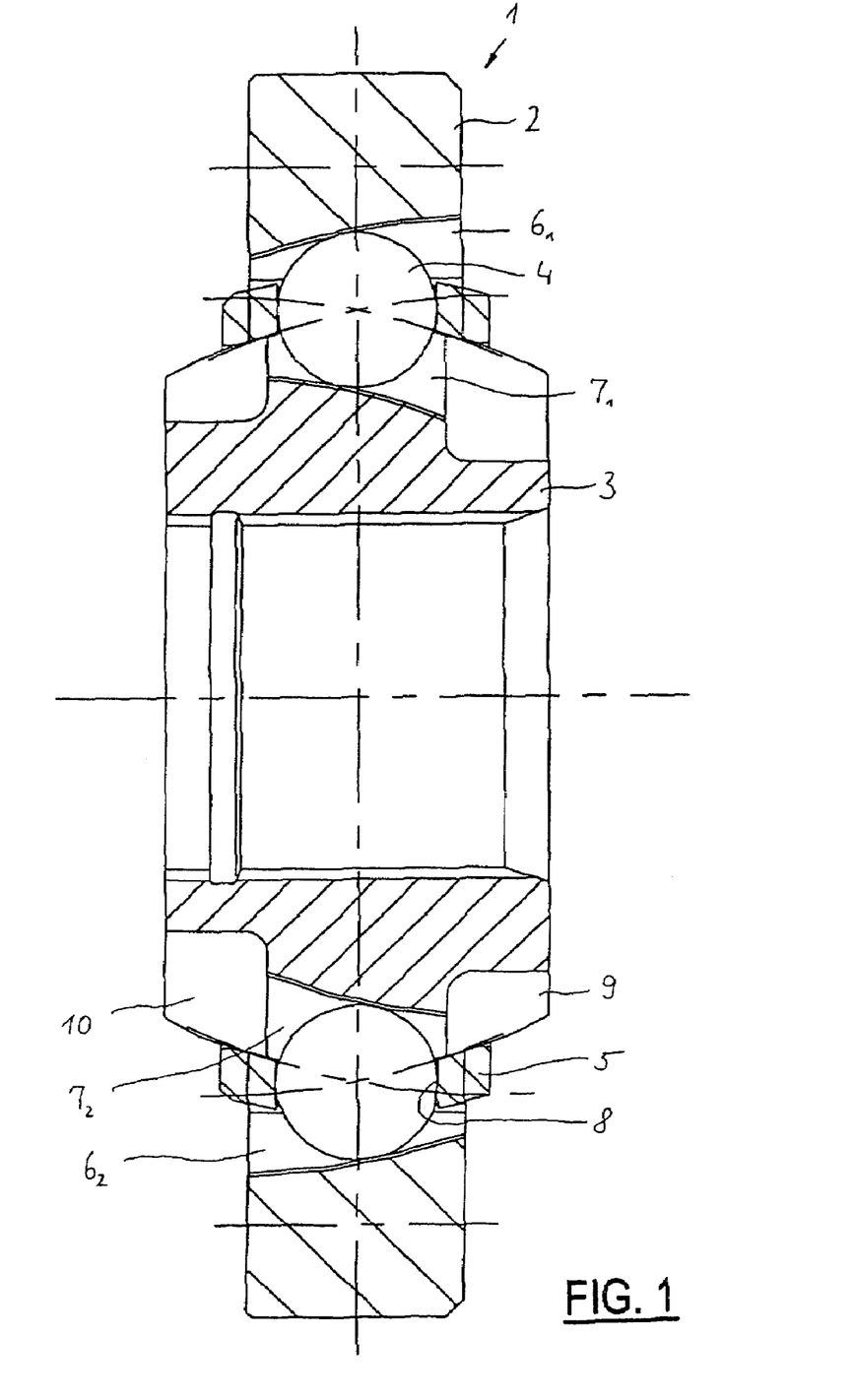
FIG. 1 shows an inventive joint in a first embodiment in a longitudinal section through an assembled joint.

FIG. 1 is a longitudinal section through a constant velocity fixed ball joint 1 in the form of a counter track joint. It is possible to identify an outer joint part 2, an inner joint part 3, balls 4 and a ball cage 5 in the form of different individual components. The upper half of the Figure shows a pair of tracks consisting of a first outer ball track $6_1$ in the outer joint part 2 and a first inner ball track $7_1$ in the inner joint part 3, which pair of tracks forms an opening angle which opens towards the right. The lower half of the Figure shows a pair of tracks consisting of a second outer ball track $6_2$ in the outer joint part 2 and a second inner ball track $7_2$ in the inner joint part 3, which pair of tracks forms an opening angle which opens towards the left. A joint with this type of ball track formation is referred to as counter track joint. The two types of pairs of tracks normally alternate across the circumference, i.e. such joints comprise an even number of balls. The balls 4 are received by cage windows 8 in the ball cage 5 which holds all the balls by way of their centers in a common plane. The inner ball tracks 7 comprise widening end portions 9, 10 which cannot serve to guide the balls. Further details will be explained with reference to the subsequent FIGS. 2 and 3.

Figure 2A:
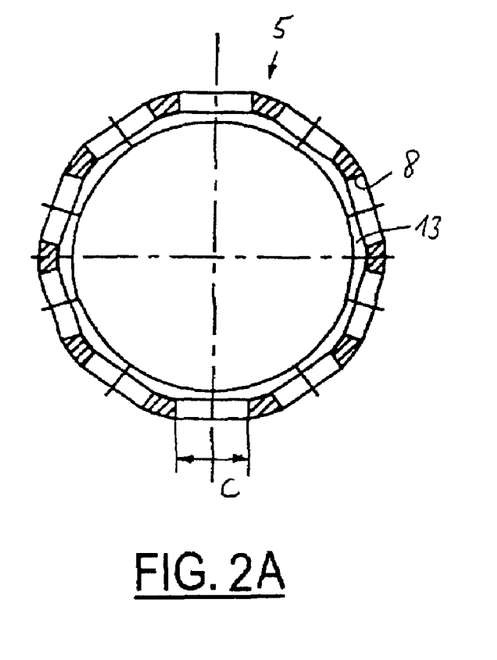
Figure 2B:
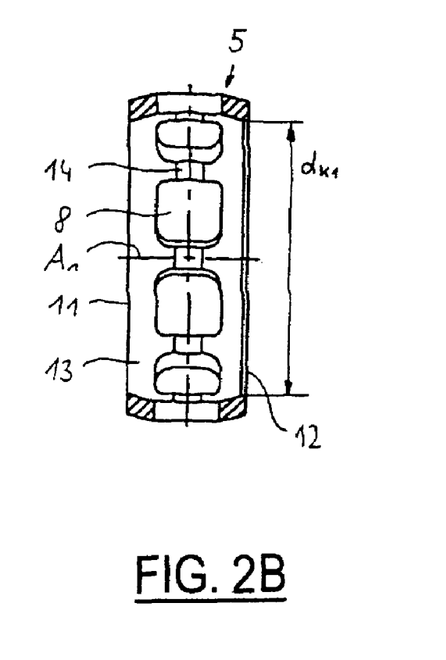

FIG. 2 shows the ball cage 5 in detail, and there is provided a total number of 10 circumferentially distributed cage windows 8. The annular ball cage 5 comprises two end apertures 11, 12 with a smallest inner diameter $d_{K1}$. Between said end apertures 11, 12 there extends a widened inner face 13 which comes into a centering contact with outer faces of the inner joint part 3. In the inner face 13, there is provided a deepening circumferential groove 14 which extends in the form of portions between the cage windows 8.

Figure 3A:
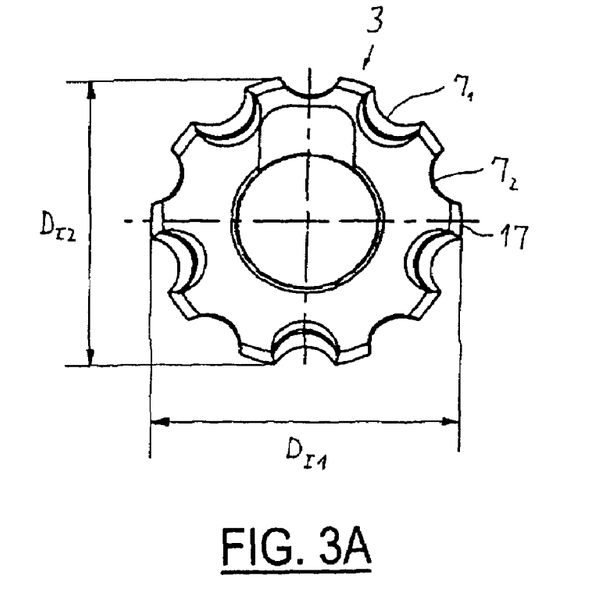
Figure 3B:
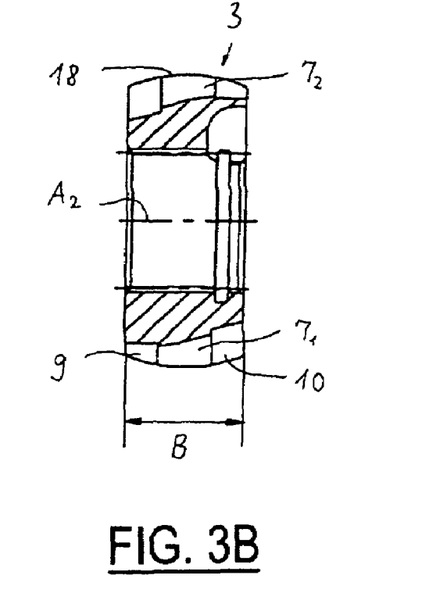

FIG. 3 shows the inner joint part 3 in detail, comprising the first inner ball tracks $7_1$ and the second inner ball tracks $7_2$ which extend in opposite directions relative to one another and which widen in opposed axial directions. Furthermore, it is possible to see the widening end portions 9, 10. Each two adjoining inner ball tracks $7_1$, $7_2$, together, form a web 17 whose axial length B, which substantially corresponds to the axial length of the inner joint part 3, is greater than the circumferential extension C of the cage windows 8 at the ball cage 5 according to FIG. 2. Opposed webs 17, together, form a greatest outer diameter $D_{J1}$ of the inner joint part 3. Opposed inner ball tracks $7_1$, $7_2$, by means of their delimiting edges, define the smallest side projection with an outer diameter $D_{J2}$. The webs 17 form part of an outer surface 18 partial portions of which come into a stopping contact delimiting the axial path or in a centering guiding contact with the inner face 13 of the ball cage 5.

Figure 4:
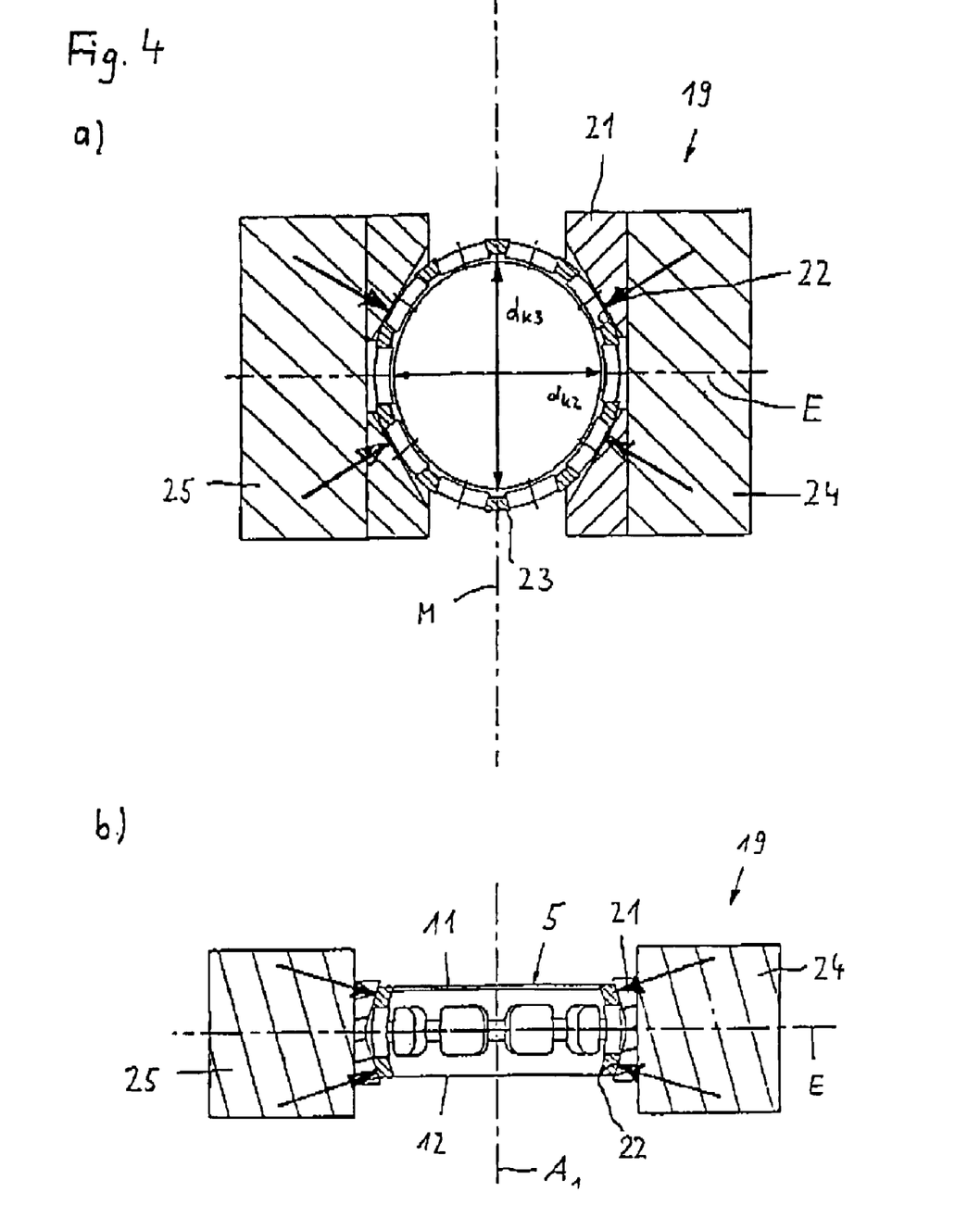
Figure 5:
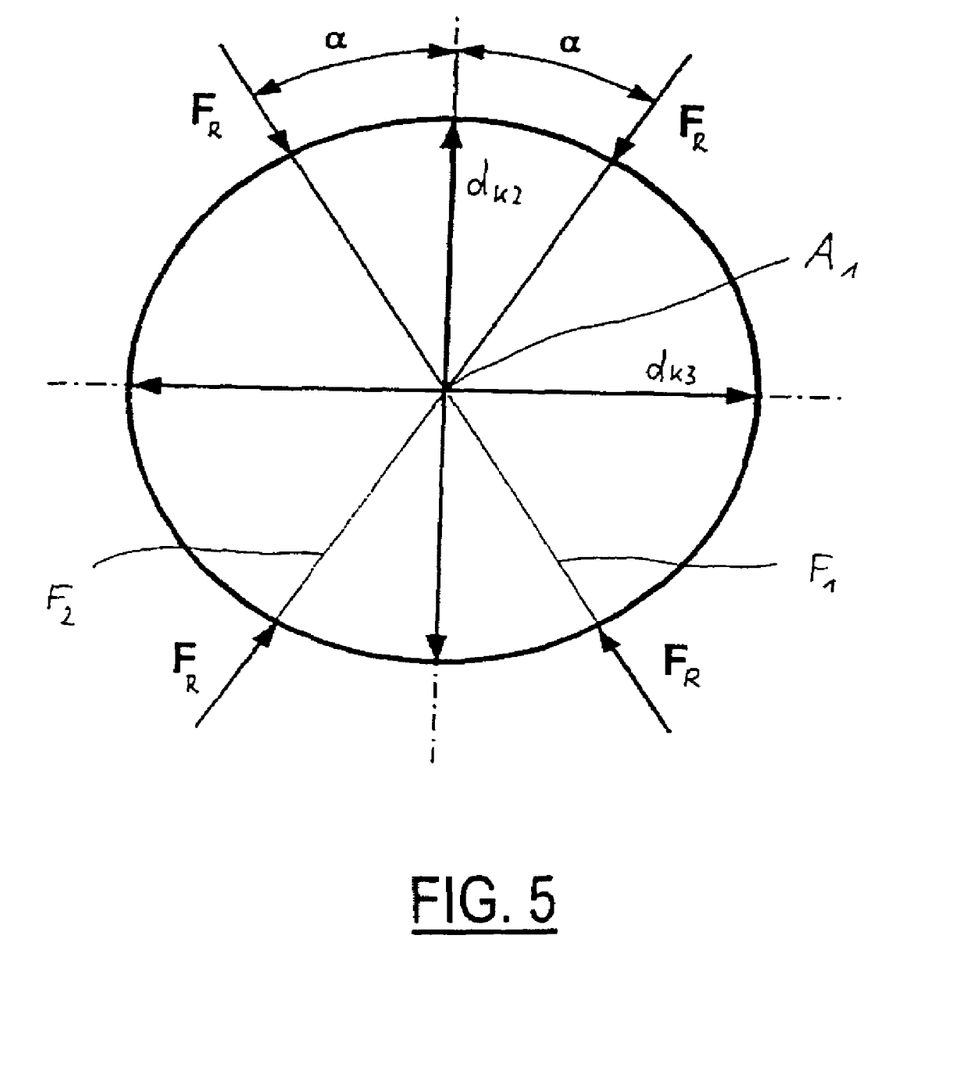
FIG. 5 is a diagrammatic illustration of the radial forces acting on the component to be ovalized.

FIGS. 4 and 5 will be described jointly below because they are associated with one another. FIG. 4 shows an inventive device 19 with a ball cage 5 in a cross-sectional view and in a longitudinal section. The ball cage 5 is shown in an elastically ovalized form for assembling the inner joint part 3. The maximum dimension $d_{K3}$ of the end apertures 11, 12 is increased relative to the starting diameter $d_{K1}$ according to FIG. 2B, and the smallest dimension $d_{K2}$ of the end apertures 11, 12 is reduced in size relative to the starting diameter $d_{K1}$.

The device 19 for ovalizing operations comprises four jaws 21 with the associated pressure faces 22 which serve to generate radial force components acting on the ball cage 5. Each two adjoining jaws 21 are held in a common carrier 24, 25. The jaws can be either firmly connected to the associated carriers or they can be displaceable and fixable relative thereto. By designing the jaws 21 to be displaceable relative to the respective carriers 24, 25, it becomes possible to use the device for different ball cage sizes. Further, the jaws 21 make it possible to set an optimum pressure. As shown in FIG. 4B, the pressure faces 22 of the jaws 21, if viewed in a longitudinal section, are adapted to the spherical disc-shaped outer face of the ball cage 5 and have a concave shape. The radial deformation faces thus do not act axially in the region of the cage windows, but on the annular portions axially adjoining the cage windows. This is advantageous for achieving a uniform elastic deformation. In addition, because every jaw with its pressure face—if viewed in a longitudinal section—is able to transmit forces to the ball cage in two points, the ball cage, during the ovalizing operation, is held in an axially centered way relative to the device 19. The forces generated by a pressure face 22 are also referred to as a group of forces.

The two carriers 24, 25 with their associated jaws 21 are arranged mirror-symmetrically relative to a central plane M positioned therebetween. In respect of the force effect, two diametrically opposed jaws 21 form a pair in that the radial forces $F_R$ required for ovalizing purposes, at the start of ovalization, are positioned in a common force-effecting plane $F_1$, $F_2$. In order to achieve an inner diameter $d_{K3}$ increased to its maximum while at the same time keeping the stresses in the ball cage at their minimum value, the force effecting planes $F_1$, $F_2$ extending through the contact faces between the ball cage 5 and the pressure faces 22, at the start of ovalization, enclose an angle $2\alpha$ which ranges between 50° and 70°. The pressure faces 22 are arranged approximately normally relative to the force effecting planes $F_1$, $F_2$ to ensure that any friction forces occurring between the pressure faces 22 and the ball cage 5 are kept at a minimum. In order to reduce the risk of ovalization resulting in permanent deformation, the ball cage 5 is inserted into the device in such a way that, by means of two webs 23 each positioned between two cage windows 8, it is arranged on the central plane M. In this way, the stresses occurring during deformation are distributed on to the greatest possible face of intersection between the central plane M and the ball cage 5.

A ball cage 5 is ovalized by being placed into the device 19. Subsequently, the two carriers 24, 25 are moved towards each other, so that, via the pressure faces 22, four groups of radial forces $F_R$ of identical magnitude are applied to the ball cage 5. The ball cage 5 is thus elastically deformed, assuming an oval shape with a greater inner diameter $d_{K3}$ and a smaller inner diameter $d_{K2}$. The inner joint part 3 of FIG. 3 can thus be introduced into the ball cage 5. After this has been achieved and after the jaws 21 have been returned into the starting position, so that no more forces act on the ball cage 5, the latter again assumes an annular shape and can be removed from the device 19.

Figure 6A:
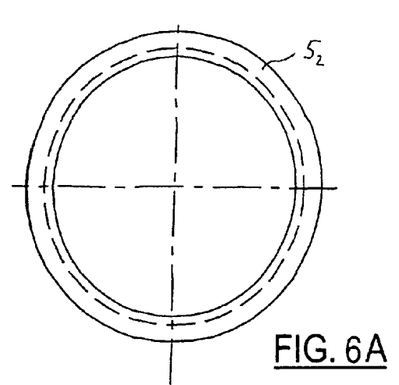

FIG. 6 shows the assembly sequence of an inner joint part 3 in an ovalized ball cage 5, with FIG. 6A showing a ball cage $\mathbf{5}_2$ in an elastically ovalized shape for mounting the inner joint part 3.

Figure 6B:
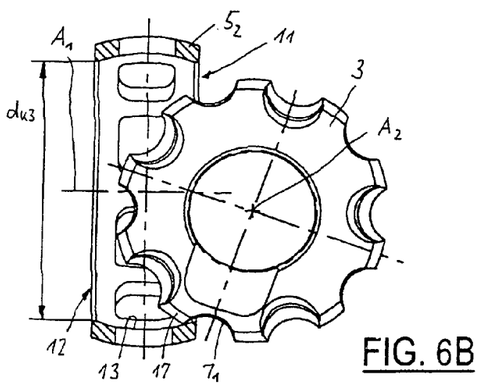
Figure 6C:
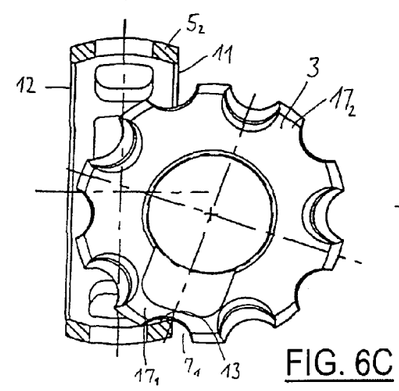
Figure 6D:
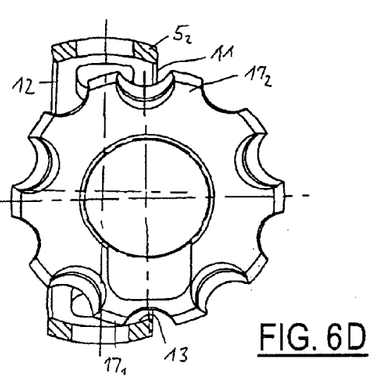

In FIG. 6B, the ball cage $\mathbf{5}_2$ shown in a cross-sectional view with a first longitudinal axis $A_1$ is illustrated in its accurate position relative to the illustration in FIG. 6A, so that the maximum dimension $d_{K3}$ is shown in the cross-sectional plane. An inner joint part 3 is shown in a plan view with an axis $A_2$ extending perpendicularly relative to the drawing plane in a position in which it has partially been introduced through the end aperture 11 into the interior of the ball cage $\mathbf{5}_2$ which is shown with its axis $A_1$ positioned in the drawing plane. In the region of the maximum dimension $d_{K3}$, the circumferential edge of the end aperture 11 engages one of the first inner ball tracks $\mathbf{7}_1$ of the inner joint part 3. A similar assembly step could be carried out with the second inner ball tracks $\mathbf{7}_2$. A web 17 adjoining said circumferential edge, by means of its edge, touches the inner face 13 of the ball cage $\mathbf{5}_2$.

Figure 6E:
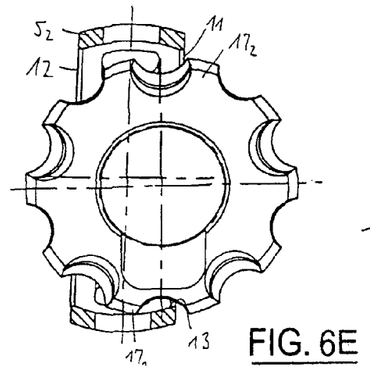
Figure 6F:
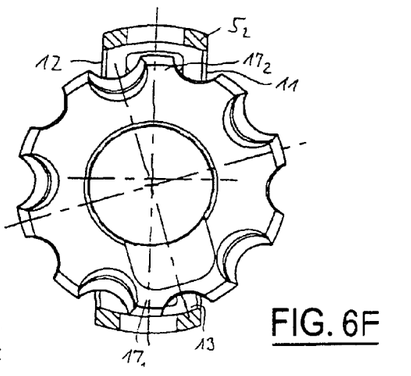

While the illustration of the ball cage $\mathbf{5}_2$ remains the same, FIGS. 6C to 6F show a progressive rolling movement of the inner joint part 3 over said edge of the web $\mathbf{17}_1$, wherein a web $\mathbf{17}_2$ positioned radially opposite the web $\mathbf{17}_1$, at an imaginary point in time, passes through the phase of movement according to FIGS. 6E and 6F with a narrow play through the first end aperture 11 of the ball cage $\mathbf{5}_2$. This can only be achieved by increasing the maximum dimension $d_{K3}$ relative to the starting diameter $d_{K1}$, which would not allow such a passage.

Figure 7A:
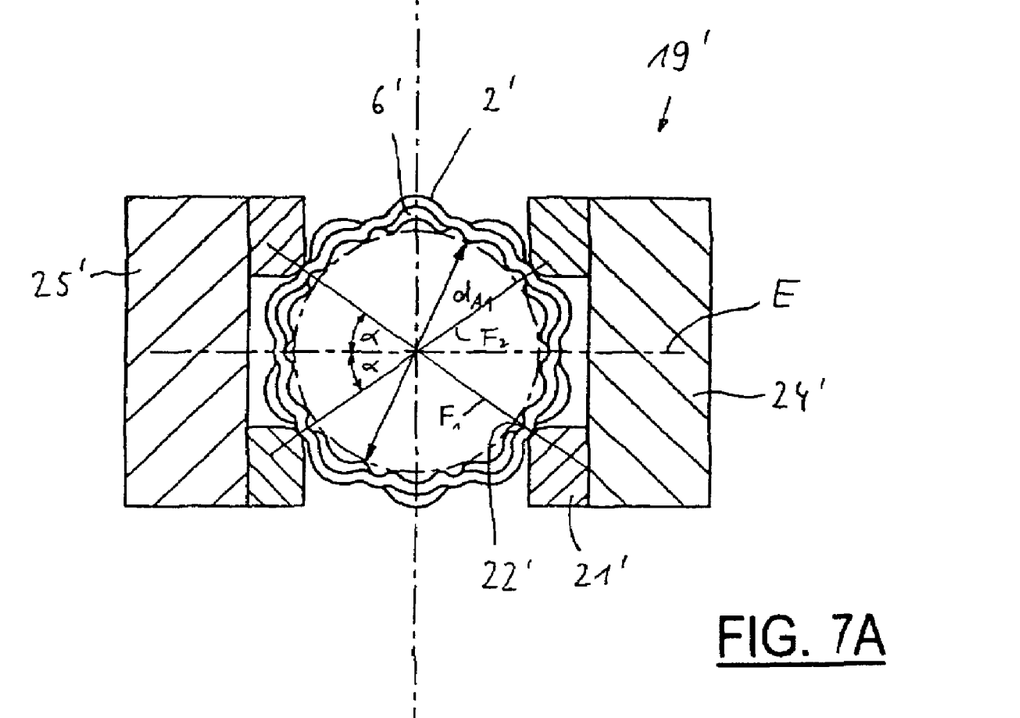
Figure 7B:
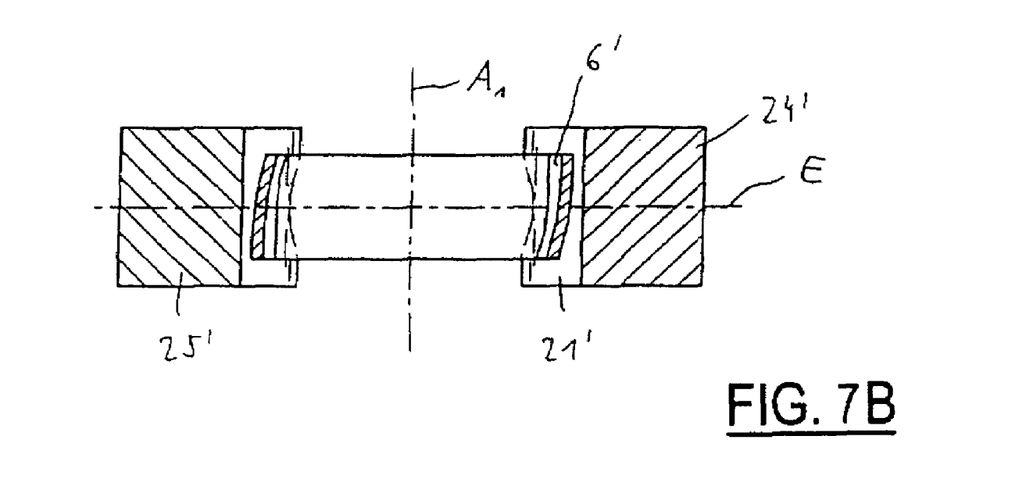

FIG. 7 shows an inventive device for ovalizing an outer joint part, which device corresponds to the main characteristics of the device according to FIGS. 4 and 5. To that extent, reference is made to the above description.

The outer joint part 2' to be ovalized is part of a constant velocity counter track joint in which two opposed outer ball tracks 6' open in different directions, as is particularly noticeable in FIG. 7B. In the assembled condition, the constant velocity joint, in addition to the outer joint part 2' with outer ball tracks 6', comprises an inner joint part with inner ball tracks, a ball cage with cage windows as well as balls which are held in the cage windows and, for torque transmitting purposes, are guided in pairs of tracks each consisting of an inner ball track and an outer ball track 6'. In contrast to the outer joint part 6 shown in FIG. 1, the present outer joint part 2' is not solid, but it is a plate metal part with an approximately uniform wall thickness. When the constant velocity joint is operated, this embodiment has advantages in that the outer joint part 2' can be deformed to a limited extent, so that stresses can be relieved. In the valley between two adjoining outer ball tracks 6', the outer joint part 2' comprises a smallest inner diameter $d_{A1}$ which is smaller than the greatest outer diameter of the ball cage to be mounted (not illustrated). For the purpose of introducing a ball cage which, with its side projection, is larger than the aperture of the outer joint part, the outer joint part 2' is ovalized by the device 19' as illustrated.

The device 19' comprises two carriers 24', 25' each having two jaws 21' which are firmly connected to the carrier. In a cross-sectional view, the jaws each comprise a rounded pressure face 22' which is able to engage an indentation formed between two outer ball tracks 5'.

To achieve an inner diameter which is increased to its maximum value, while, at the same time, ensuring minimum stresses in the outer joint part 2', the two effective planes $F_1$, $F_2$ of the radial force components, at the start of ovalization, enclose an angle $2\alpha$ which ranges between 50° and 70°. The pressure faces 22' are arranged approximately normally relative to the direction of force of the radial force components, so that any friction forces occurring between the pressure faces and the outer joint part 2' are kept at a minimum. In the course of deformation, the radial force components are all of the same magnitude, so that it is possible to achieve maximum ovalization of the outer joint part while at the same time keeping the component stresses to a minimum.

For ovalizing the outer joint part 2', it is placed into the device 19'. Subsequently, the two carriers 24', 25' are moved towards each other, so that, via the pressure faces 22', radial forces are applied to the outer joint part 2'. The outer joint part 2' thus assumes an oval shape with a greatest inner diameter and a smallest inner diameter. The ball cage which has already been preassembled with the inner joint part can be introduced into the outer joint part 2'. After this has taken place and after the jaws 24', 25' have been returned into the starting position, so that no more forces are applied, the outer joint part 2' again assumes an annular shape and can be removed from the device 19'.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A method of assembling joint components of a constant velocity universal joints comprising:
   providing an annular first joint component in the form of a ball cage with a greater diameter and with a first longitudinal axis ($A_1$);
   providing an annular or star-shaped second joint component with a smaller diameter and with a second longitudinal axis ($A_2$) for introduction into the first annular component, wherein, in the starting condition, an introducing aperture in the first joint component is smaller than the smallest radial projection area of the second joint component; and ovalizing the first joint component with at least four circumferentially distributed groups of forces for introducing the second joint component, with the first and second longitudinal axes ($A_1$, $A_2$) being positioned perpendicularly relative to one another, wherein each group of forces comprises at least two forces, wherein the forces of each group, if viewed in a longitudinal section of said first joint component, are directed towards a common point on said first longitudinal axis.

2. A method according to claim 1, wherein two diametrically opposed groups of forces form a pair of groups of forces comprising, in the starting condition, a common force effecting plane containing the first longitudinal axis ($A_1$).

3. A method according to claim 2, wherein, in the starting condition, the force effecting planes of the at least two pairs of groups of forces ($F_R$) enclose an angle ($2\alpha$) between 50° and 70°.

4. A method according to claim 1, wherein the first joint component is provided in the form of a ball cage and the second joint component is provided in the form of an inner joint part.

5. A method according to claim 1, wherein the first joint component is provided in the form of an outer joint part and the second joint component is provided in the form of a ball cage.

6. A method according to claim 4 comprising, subsequently, introducing the inner joint part and ball cage assembly into an ovalized outer joint part.

7. A method according to claim 1, wherein, for elastically deforming the first joint component, the at least four groups of forces are of identical magnitudes.

* * * * *

UNITED STATES PATENT AND TRADEMARK OFFICE
CERTIFICATE OF CORRECTION

PATENT NO.        : 7,370,400 B2  
APPLICATION NO.   : 10/829828  
DATED             : May 13, 2008  
INVENTOR(S)       : Herbert Cermak Page 1 of 1

It is certified that error appears in the above-identified patent and that said Letters Patent is hereby corrected as shown below:

<u>Title Page</u>:

Item [73], Assignee name from "GKN Driveland Deutschland GmbH (DE)" to "GKN Driveline Deutschland GmbH (DE)"

Signed and Sealed this

Fifth Day of May, 2009

JOHN DOLL  
*Acting Director of the United States Patent and Trademark Office*